United States Patent
Wu

(10) Patent No.: US 8,594,236 B2
(45) Date of Patent: Nov. 26, 2013

(54) RADIO COMMUNICATION SYSTEM, BASE STATION, MOBILE STATION, AND RADIO COMMUNICATION METHOD

(75) Inventor: Jianming Wu, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 100 days.

(21) Appl. No.: 13/170,936

(22) Filed: Jun. 28, 2011

(65) Prior Publication Data

US 2011/0255616 A1 Oct. 20, 2011

Related U.S. Application Data

(63) Continuation of application No. PCT/JP2009/000021, filed on Jan. 6, 2009.

(51) Int. Cl.
*H04L 27/00* (2006.01)
(52) U.S. Cl.
USPC ......................................................... 375/299
(58) Field of Classification Search
USPC .......................................... 375/267, 299, 347
See application file for complete search history.

(56) References Cited

U.S. PATENT DOCUMENTS

| | | | | |
|---|---|---|---|---|
| 4,082,922 | A * | 4/1978 | Chu | 370/230 |
| 8,107,392 | B2 * | 1/2012 | Lee et al. | 370/252 |
| 8,300,563 | B2 * | 10/2012 | Krishnaswamy et al. | 370/310 |
| 2008/0045147 | A1 | 2/2008 | Okuda | |
| 2008/0080437 | A1 * | 4/2008 | Krishnaswamy et al. | 370/338 |

FOREIGN PATENT DOCUMENTS

| | | |
|---|---|---|
| CN | 101083518 | 12/2007 |
| EP | 1379020 | 1/2004 |
| EP | 1890405 | 2/2008 |
| JP | 2004-064108 | 2/2004 |
| JP | 2007-013345 | 1/2007 |
| JP | 2007-214993 | 8/2007 |
| JP | 2008-017487 | 1/2008 |
| JP | 2008-048202 | 2/2008 |

OTHER PUBLICATIONS

International Search Report issued for corresponding International Patent Application No. PCT/JP 2009/000021, mailed Mar. 31, 2009.
Baseline Document for Draft Standard for Local and Metropolitan Area Networks; "Part 16: Air Interface for Fixed and Mobile Broadband Wireless Access Systems"; Multihop Relay Specification; 802.16j-06/026r4; Jun. 6, 2007.

(Continued)

*Primary Examiner* — Kevin Kim
(74) *Attorney, Agent, or Firm* — Myers Wolin, LLC

(57) ABSTRACT

A radio communication system includes a reception apparatus and a transmission apparatus. The reception apparatus includes a first wireless communication interface and a first processor. The transmission apparatus includes a second wireless communication interface configured to transmit a wireless signal to the reception apparatus and a second processor configured for generating a plurality of data blocks and a grouped data block obtained by grouping the plurality of data blocks and controlling the second wireless communication interface to transmit the plurality of data blocks through a first radio transmission path, and to transmit the grouped data block through a second radio transmission path better in radio transmission quality than the first radio transmission path. The first processor is configured for controlling the first wireless communication interface to receive the plurality of data blocks transmitted through the first radio transmission path, the grouped data block transmitted through the second radio transmission path.

11 Claims, 11 Drawing Sheets

(56) References Cited

OTHER PUBLICATIONS

China Mobile et al; "Application Scenarios for LTE-Advanced Relay"; Agenda Item: 12 Study Item on LTE-Advanced; TSG-RAN WG1 #54; R1-082975; Jeju, Korea; Aug. 18-22, 2008.

Fujitsu, "Grouped and Encoded Packet based HARQ for LTE-Advanced", Agenda Item: 11.3, Nov. 10-14, 2008, 3GPP TSG-RAN1 #55, R1-084295, Prague, Czech Republic.

Fujitsu, "Relaying with Channel Resource Reuse and SIC for LTE-Advanced", Nov. 10-14, 2008, 3GPP TSG-RAN1 #55, R1-084297, Prague, Czech Republic.

First Notification of Office Action issued for corresponding Chinese Patent Application No. 200980152763.5, issued Jun. 7, 2013, with full English translation.

* cited by examiner

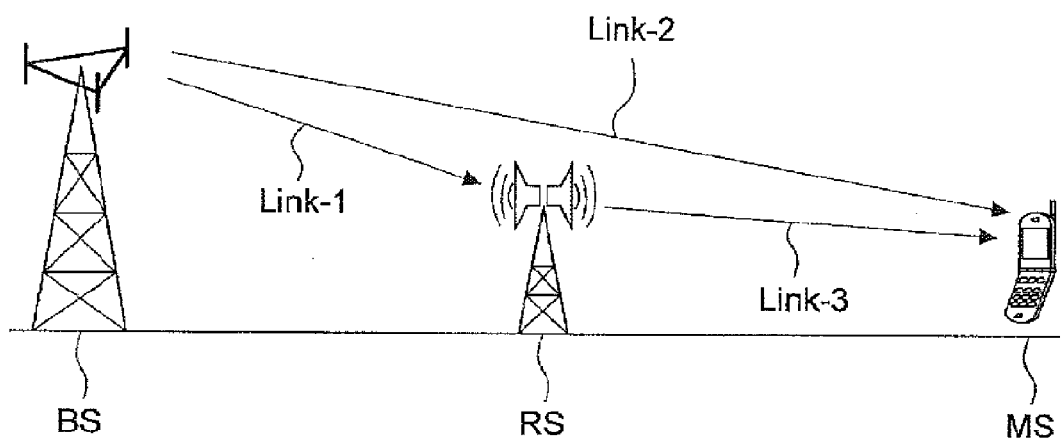
F I G. 1

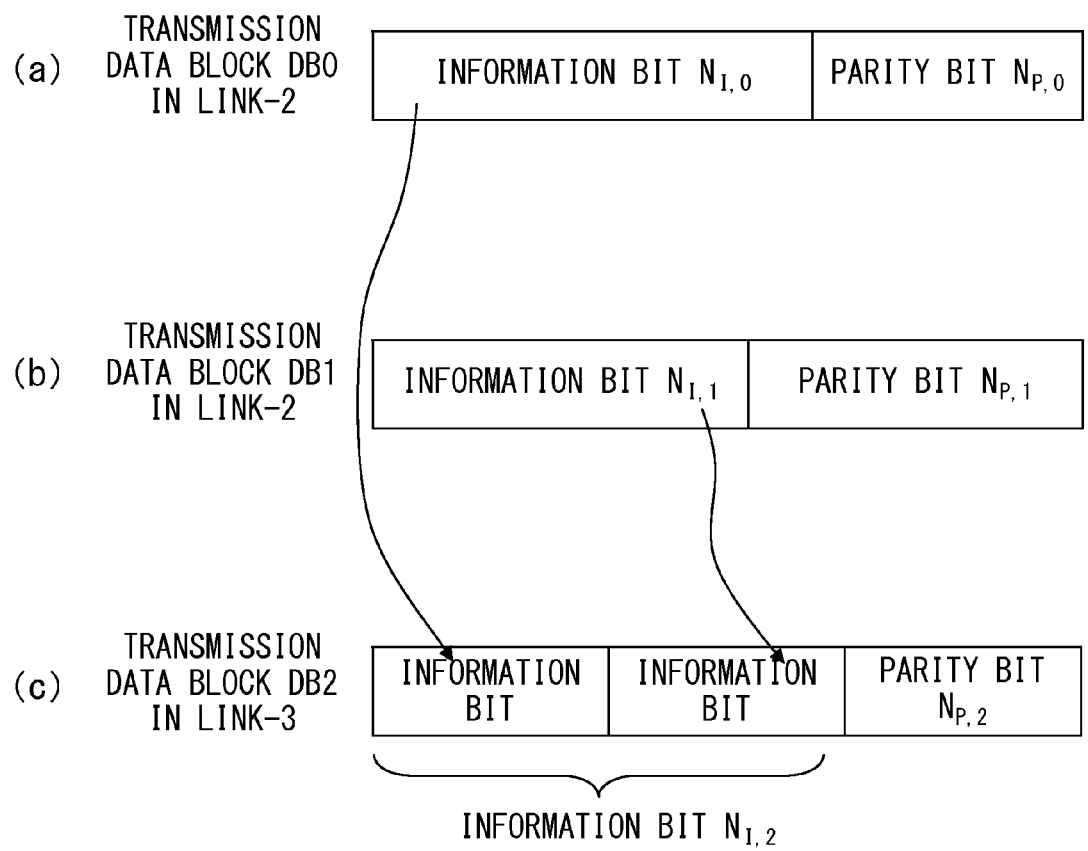
F I G. 2

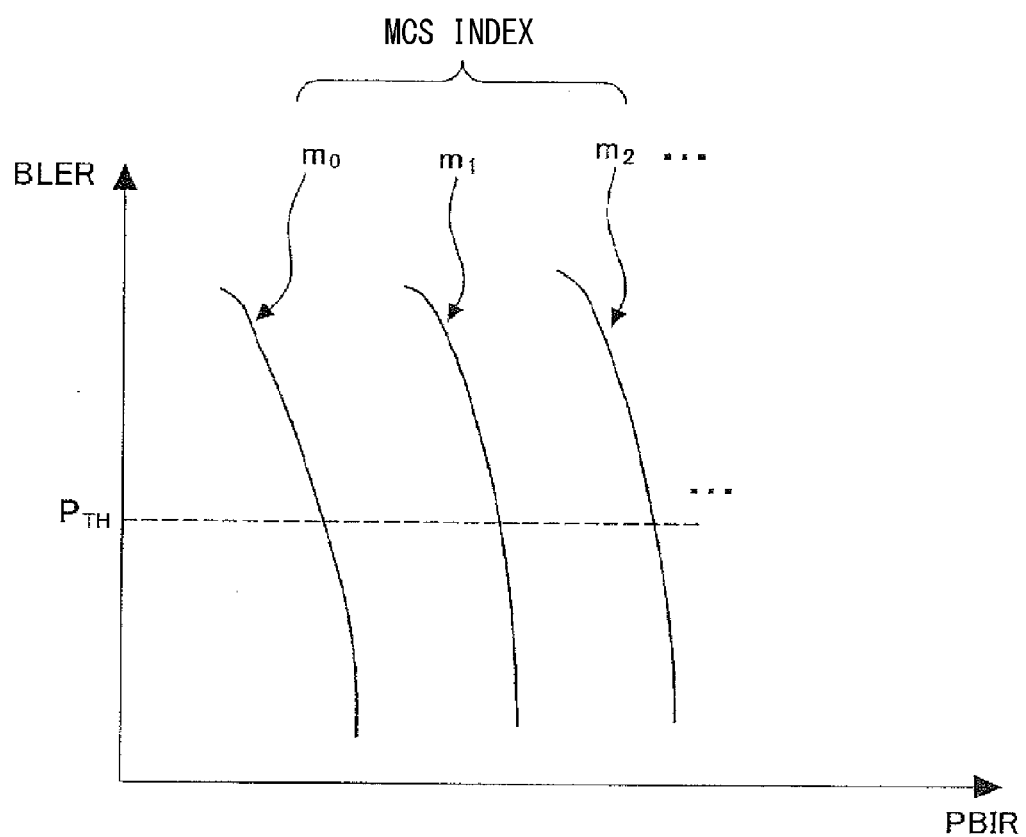
F I G. 3

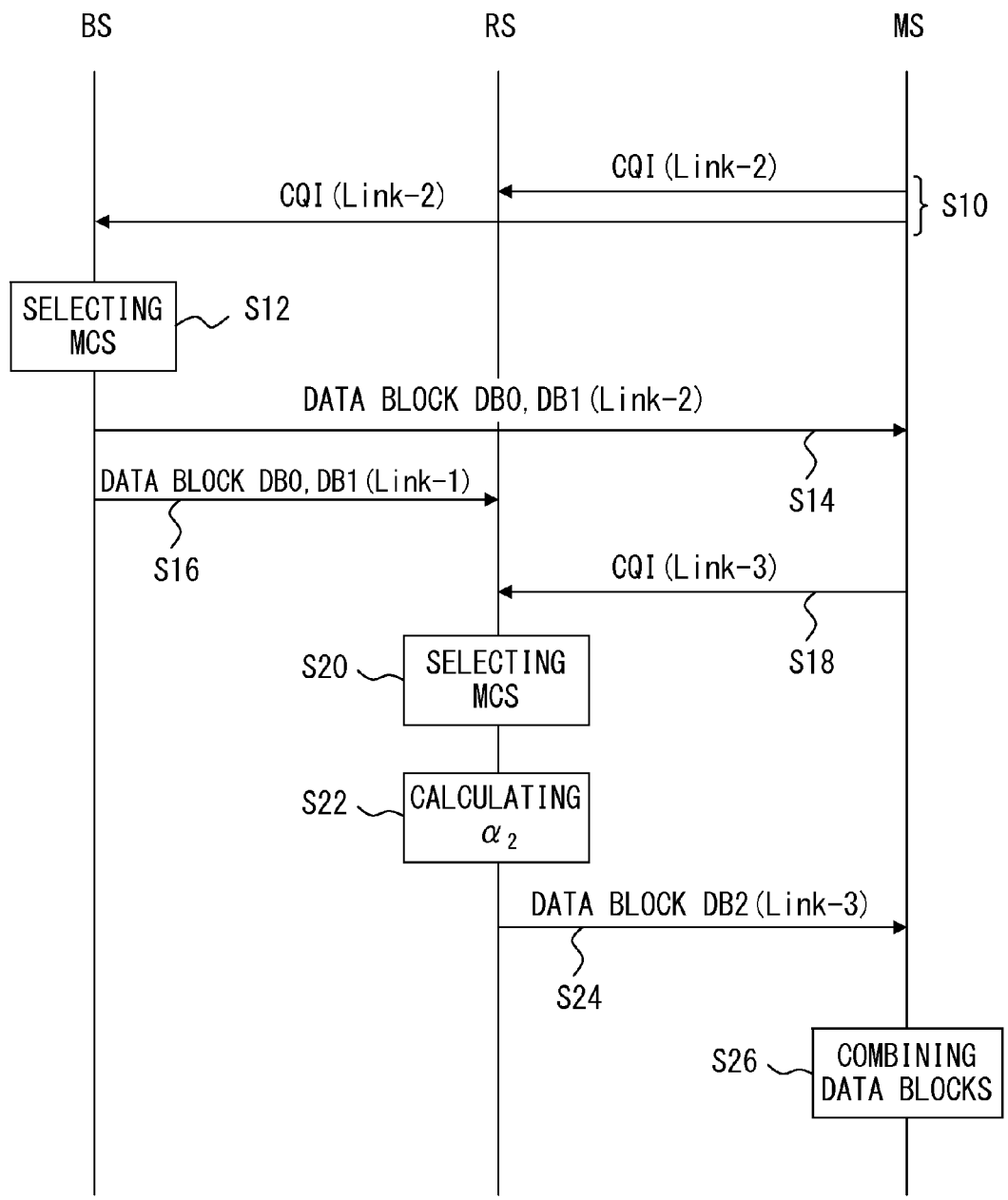
F I G. 7

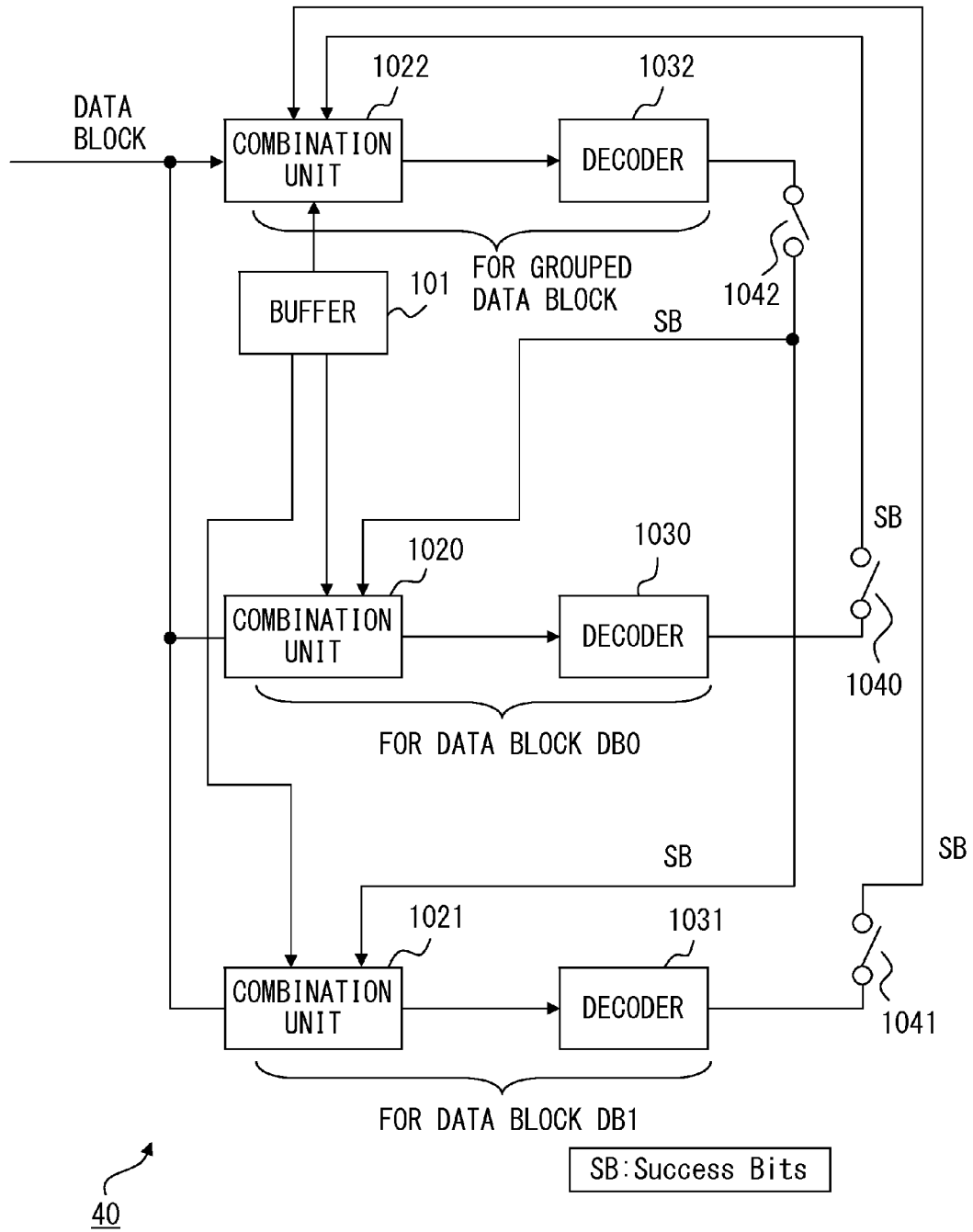
F I G. 9

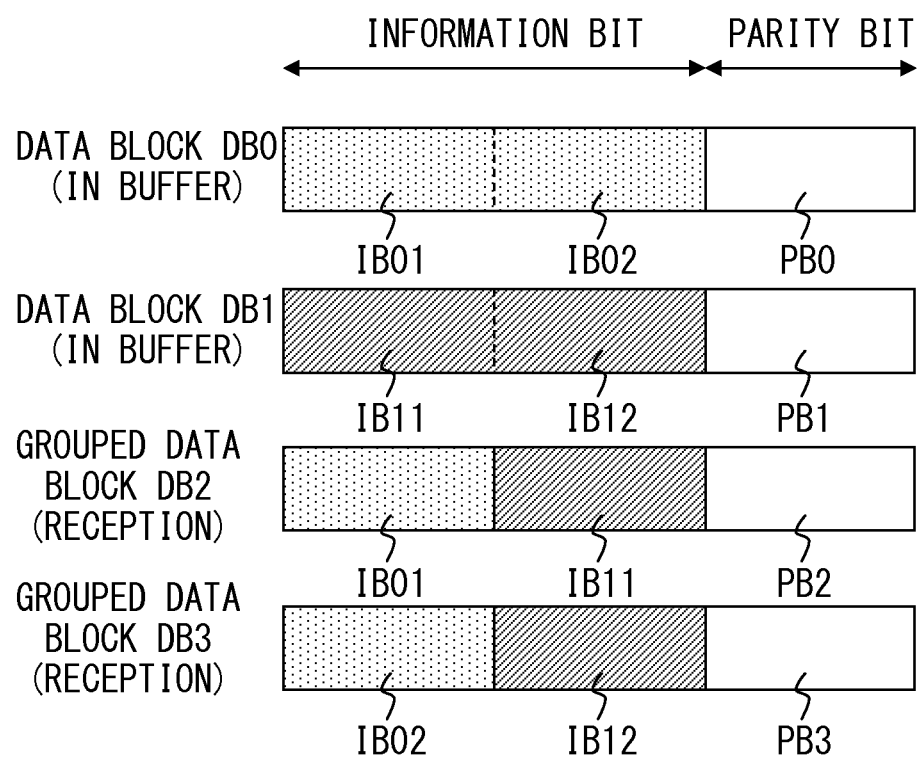
F I G. 1 0

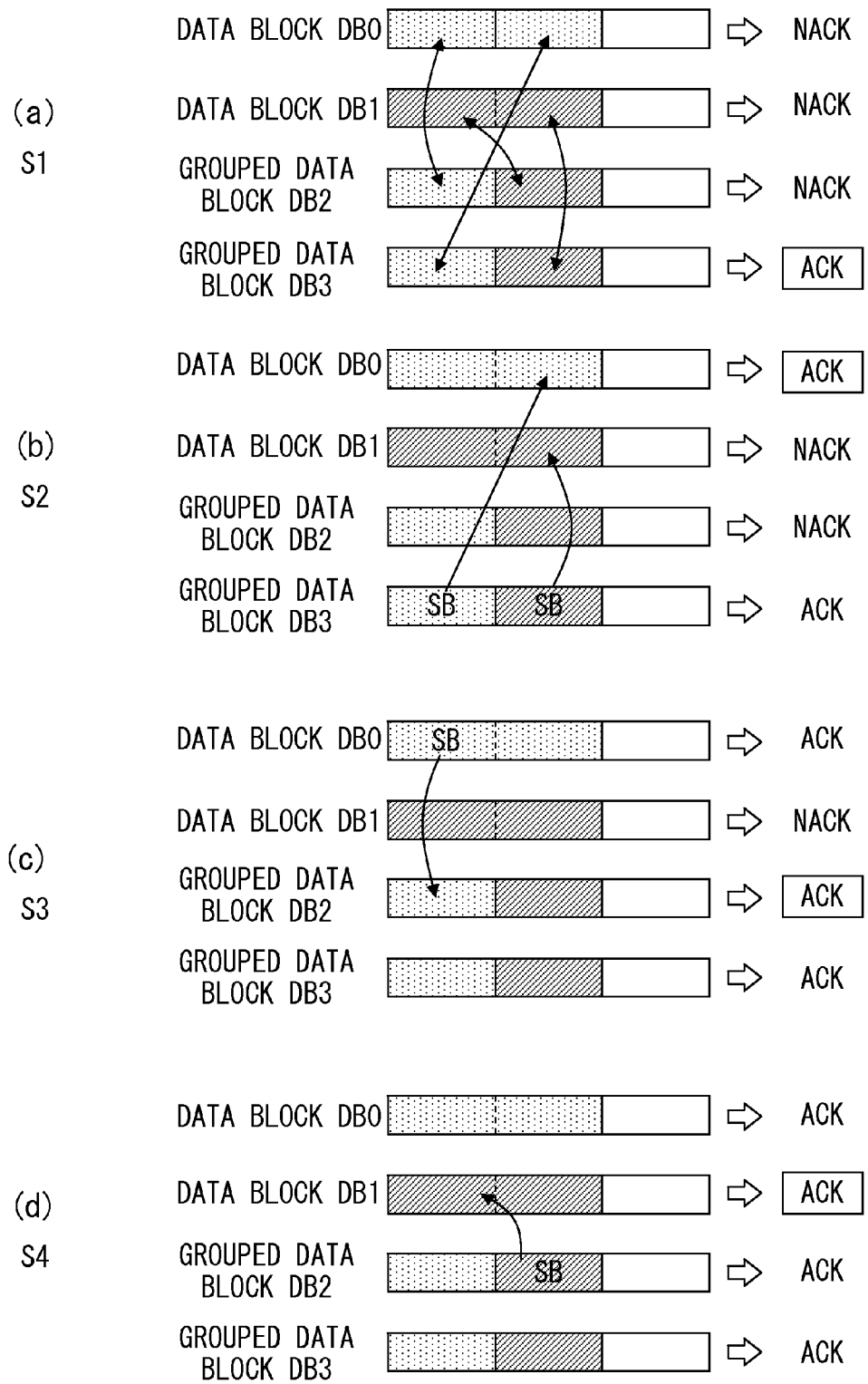
F I G. 1 1

RADIO COMMUNICATION SYSTEM, BASE STATION, MOBILE STATION, AND RADIO COMMUNICATION METHOD

CROSS-REFERENCE TO RELATED APPLICATION

This application is a continuation of PCT application PCT/JP2009/000021, filed on Jan. 6, 2009, the entire contents of which are wholly incorporated herein by reference.

FIELD

The embodiments discussed herein are related to the radio communication technology performed between a reception device and a transmission device.

BACKGROUND

In a next generation radio communication system for which a high-speed transmission of 100 M through 1 G bit/sec. is requested, it is assumed that a high frequency band is assigned. However, a high frequency band signal generally has higher rectilinearity than a low frequency band signal, and it is known that there occur a number of dead zones where radio waves cannot travel. Therefore, if it is assumed that the transmission power of a base station is equal to that of the currently commercialized radio communication system, the assignment of a high frequency band reduces the coverage of cells (service area). It is not preferable not only in rise of cost by an increasing number of base stations but also in occurrence of frequent handover.

Under the circumstances, there is a radio communication system proposed by implementing a relay station for relaying radio communications between a base station and a mobile station. Generally, since a relay station is less costly than a base station, the entire system can be realized at a low cost while maintaining sufficient coverage by implementing the relay station. The radio communication system provided with the relay station (hereinafter referred to as a relay system) is disclosed in, for example, the following non-patent document 1. The relay system is also surveyed in the LTE (Long Term Evolution)-advanced as disclosed in, for example, the following non-patent document 2.

Non-patent Document 1: 802. 16j-06/026r4, Air Interface for Fixed and Mobile Broadband Wireless Access Systems: Multihop Relay Specification, Jun. 6, 2007.

Non-patent Document 2: China Mobile, Vodafone, and Huawei, "Application Scenarios for LTE-AdvancedRelay", R1-082975, Aug. 18-22, 2008.

In the relay system, it is assumed that data is transmitted through radio waves along a downlink from a base station to a mobile station through a relay station. In this case, when the mobile station is located relatively near the relay station, the radio transmission quality using the relay station is generally better than in the radio transmission of data from the base station directly to the mobile station. First, the propagation environment between the base station and the relay station enables a LOS (Line Of Sight) communication, and communications can be performed with high directivity using the beam forming technology from the base station to the relay station with a fixed arrangement. Second, the propagation environment from the relay station to the mobile station is better than that from the base station to the mobile station.

Accordingly, to improve the throughput of the entire relay system, it may be selected to adopt an appropriate modulation and coding scheme by an adaptive modulation and coding scheme (AMCS) depending on the better propagation environment from the relay station to the mobile station when data transmission is performed from the relay station to the mobile station.

SUMMARY

According to an aspect of the invention, a radio communication system includes a reception apparatus and a transmission apparatus. The reception apparatus includes a first wireless communication interface and a first processor. The transmission apparatus includes a second wireless communication interface and a second processor. The second wireless communication interface is configured to transmit a wireless signal to the reception apparatus. The second processor is configured for generating a plurality of data blocks and a grouped data block obtained by grouping the plurality of data blocks and controlling the second wireless communication interface to transmit the plurality of data blocks through a first radio transmission path, and to transmit the grouped data block through a second radio transmission path better in radio transmission quality than the first radio transmission path. The first processor is configured for controlling the first wireless communication interface to receive the plurality of data blocks transmitted through the first radio transmission path, and the grouped data block transmitted through the second radio transmission path.

According to another aspect of the invention, a base station includes a wireless communication interface and a processor. The wireless communication interface is configured to transmit a wireless signal to a mobile station. The processor is configured for generating a plurality of data blocks and a grouped data block obtained by grouping the plurality of data blocks and controlling the wireless communication interface to transmit the plurality of data blocks to a mobile station through a first radio transmission path, and transmit the grouped data block to a mobile station through a second radio transmission path better in radio transmission quality than the first radio transmission path.

According to another aspect of the invention, a mobile station includes a wireless communication interface and a processor. The processor is configured for controlling the wireless communication interface to receive a plurality of data blocks through a first radio transmission path and receive a grouped data block obtained by grouping the plurality of data blocks through a second radio transmission path better in radio transmission quality than the first radio transmission path.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 1 illustrates a radio communication system according to an embodiment;

FIG. 2 is a configuration of a data block transmitted in the radio communication system according to an embodiment;

FIG. 3 illustrates a method of selecting an MCS for a grouped data block;

FIG. 7 is a flowchart of the operation of each station indicating the operation of the radio communication system according to an embodiment;

FIG. 9 is a block diagram for explanation of an example of the configuration of the data block processing unit of the mobile station according to an embodiment;

FIG. 10 is a configuration of a plurality of data blocks and a grouped data block based on the plurality of data blocks; and FIG. 11 is an explanatory view of the process of the data blocks according to an embodiment.

DESCRIPTION OF EMBODIMENTS

Figure 4:
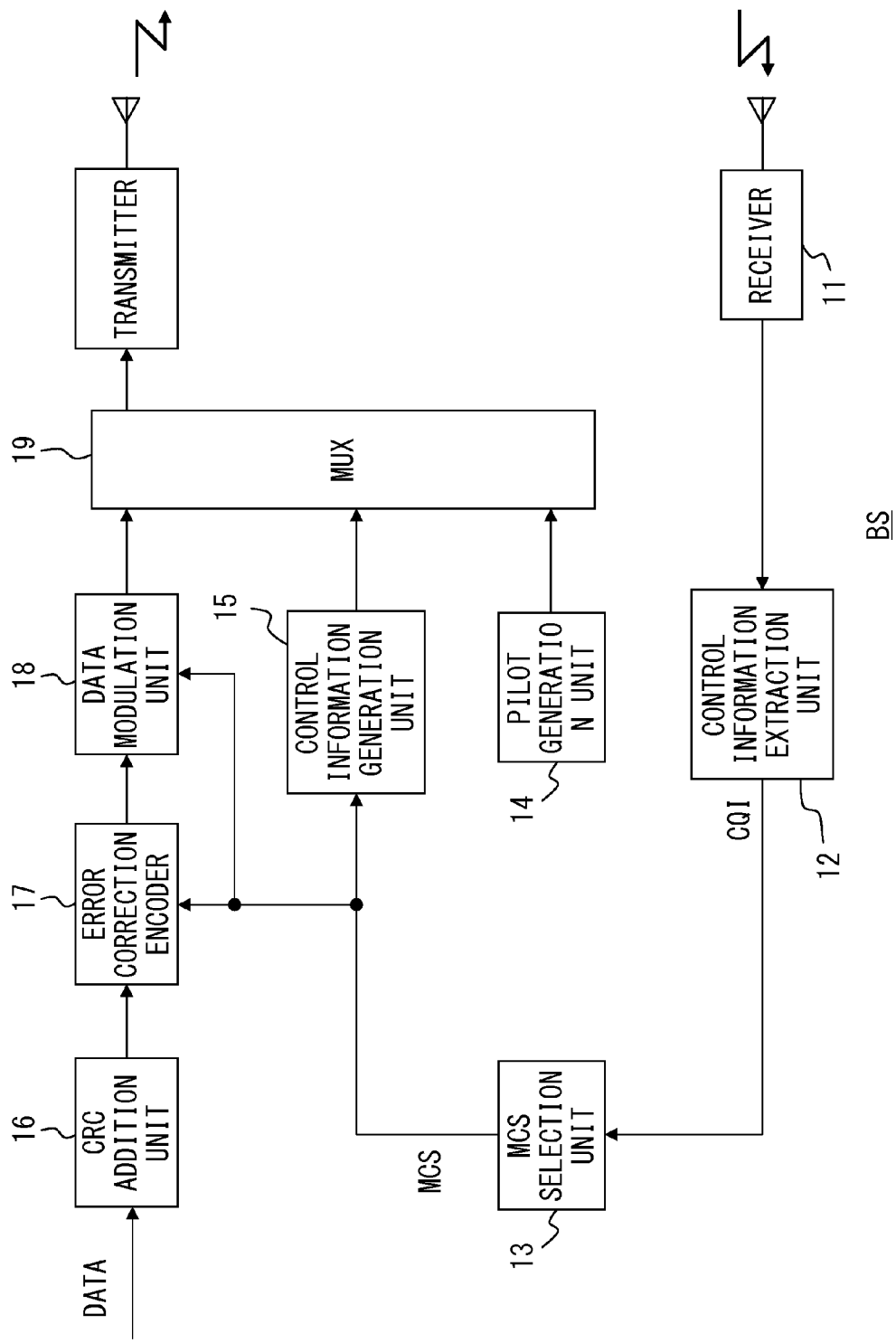
FIG. 4 is a block diagram of the important part of the internal configuration of the base station according to an embodiment.

Described below are a plurality of embodiments.

(1) First Embodiment (1-1) Radio Communication System According to the Present Embodiment As illustrated in FIG. 1, the radio communication system according to the present embodiment (hereinafter referred to as a "relay system") includes a base station (hereinafter appropriately referred to as a "BS" for short), a relay station (hereinafter appropriately referred to as an "RS" for short), and a mobile station (hereinafter appropriately referred to as an "MS" for short). The RS can relay the communication between the BS and the MS.

As illustrated in FIG. 1, in the packet transmission downstream the relay system, a packet is transmitted to the RS through a transmission link Link-1, and the packet is received in the MS in the first phase. In the second phase, the packet is transmitted from the RS to the MS.

The packet transmitted from the BS includes the data (data block having an information bit and a parity bit, and hereinafter referred to as a "data block") encoded in a predetermined systematic coding system for error correction. In the relay system according to the present embodiment, in a plurality of data blocks transmitted from the BS to the RS through the transmission link Link-1, a packet including a data block (hereinafter referred to as a "grouped data block") obtained by grouping all or a part of each data block is transmitted from the RS to the MS through a transmission link Link-3.

(1-2) Method of Generating a Data Block

The method of transmitting a data block in the relay system according to the present embodiment is described below with reference to FIG. 2. FIG. 2 is a configuration of a data block transmitted in the relay system according to the present embodiment. (a) and (b) in FIG. 2 illustrate the configuration of two data blocks DB0 and DB1 transmitted from the BS to the MS through the transmission links Link-1 and Link-2. (c) in FIG. 2 is a configuration of a grouped data block DB2 transmitted from the RS to the MS. To be preferable, the two data blocks DB0 and DB1 are data blocks in the continuously transmitted packets.

FIG. 2 is an example of generating the grouped data block DB2 after grouping a part of each data block in the RS in the two data blocks DB0 and DB1 transmitted from the BS to the RS through the transmission links Link-1 and Link-2.

In FIG. 2, the data block DB0 is configured by an information bit $N_{I,0}$ and a parity bit $N_{P,0}$, and the data block DB1 is configured by an information bit $N_{I,1}$ and a parity bit $N_{P,1}$. The grouped data block DB2 is configured by an information bit $N_{I,2}$ and a parity bit $N_{P,2}$.

As indicated by the arrow in FIG. 2, the information bit $N_{I,2}$ of the grouped data block DB2 is generated by grouping a part of the information bit $N_{I,0}$ of the data block DB0 and a part of the information bit $N_{I,1}$ of the data block DB1.

A part of the information bit $N_{I,0}$ of the data block DB0 and a part of the information bit $N_{I,1}$ of the data block DB1, which are not included in the information bit $N_{I,2}$ of the grouped data block DB2, are grouped to generate another grouped data (not illustrated in the attached drawings). Similarly, grouped data are sequentially generated.

Not a part of an information bit of a data block, but the entire information bit can be included in the information bit of a grouped data block.

In FIG. 2, in the information bit $N_{I,2}$, the information bit $N_{I,0}$ and the information bit $N_{I,1}$ are individually arranged for comprehensibility, but it is preferable to bit-interleave them.

In the downlink of the relay system according to the present embodiment, the BS transmits the data blocks DB0 and DB1 through the transmission link Link-2 (first radio transmission path), and transmits the grouped data block DB2 through the transmission links Link-1 and Link-3 (the second radio transmission path better in radio transmission quality than the first radio transmission path). The MS receives the data blocks DB0 and DB1 through the transmission link Link-2 (first radio transmission path), and receives the grouped data block DB2 through the transmission links Link-1 and Link-3 (second radio transmission path).

FIG. 2 is an example of generating the grouped data block DB2 by grouping a part of two data blocks DB0 and DB1, but the number of grouped data blocks is not limited to 2. Those skilled in the art can easily understand that three of more data blocks can be similarly grouped.

(2) Second Embodiment

Described next if the relay system according to the second embodiment.

In the relay system according to the present embodiment, the MS combines corresponding data (adding bits or symbols) between a plurality of data blocks received through the transmission link Link-2 (first radio transmission path) and the grouped data block received through the transmission links Link-1 and Link-3 (second radio transmission path). By combining the data, the SNR gain of the combined information bits is improved.

For example, as illustrated in FIG. 2, when a grouped data block is generated by two data blocks, a part of the information bit $N_{I,0}$ of the data block DB0 included in the information bit $N_{I,2}$ of the grouped data block DB2 is combined with the corresponding information bit of the data block DB0. A part of the information bit $N_{I,1}$ of the data block DB1 included in the information bit $N_{I,2}$ of the grouped data block DB2 is combined with the corresponding information bit of the data block DB1. Thus, the SNR gain of the combined information bits is improved by about 3 dB.

Also when a grouped data block is generated by three or more data blocks, the SNR gain of combined information bits is improved obviously.

(2-1) Optimization of Data Transmission of Each Transmission Link

Next, the method of optimizing the data transmission through each transmission link when two data blocks are grouped and the above-mentioned data combination is performed is described below with reference to FIG. 3. FIG. 3 illustrates a method of selecting an MCS for a grouped data block.

The optimization of the data transmission through a transmission link is performed by determining the modulation and coding scheme (hereinafter referred to as an MCS) through each transmission link and the rate of each data block included in the information bit of a grouped data block. In the following description, each data blocks (DB0 through DB2) in FIG. 2 is referenced again.

In FIG. 2, the rate of the information bit $N_{I,0}$ of the data block DB0 included in the information bit $N_{I,2}$ of the grouped data block DB2 is defined as $\alpha_2$ ($0 \leq \alpha_2 \leq 1$). Then, the information bit $N_{I,2}$ of the grouped data block DB2 includes the part of data block DB0 corresponding to a $\alpha_2 \cdot N_{I,2}$ and the part of the data block DB1 corresponding to $(1-\alpha_2) \cdot N_{I,2}$. Assuming that the amount of the information bit of each data block is predetermined, by determining the rate $\alpha_2$, the rate (hereinafter referred to as $\alpha_0$) of the portion included in the information bit $N_{I,2}$ of the grouped data block DB2 is automatically determined from the information bit $N_{I,0}$ of the data block DB0, and the rate (hereinafter referred to as $\alpha_1$) of the part included in the information bit $N_{I,2}$ of the grouped data block DB2 is automatically determined from the information bit $N_{I,1}$ of the data block DB1. Thus, in the description below, only the method of calculating the optimum rate of $\alpha_2$ is described.

As illustrated in FIG. 3, in the relay system, and in the transmission station (BS or RS), the relationship between the SNR (signal to noise ratio) and the RBIR (Received Block Mutual Information) is defined in advance by the mapping function. The RBIR is a well known index described in the documents such as "IEEE C802. 16m-07/080r3", IEEE 802.16 Broadband Wireless Access Working Group, Aug. 28, 2007, page 58-60" etc.

An SNR is estimated according to the report of the channel quality information (hereinafter referred to as a CQI) from the reception station (MS). Then, when it is assumed that the mapping function is f, and the SNR of each data block DBk (k=0 through 2) is $\Gamma_k$, $R_k$ as each RBIR before the combination of data is expressed by the following equation (1).

$$R_k = f(\Gamma_k) \quad (1)$$

Each case is described below.

(2-1-1) When the Transmission Quality of the Channel of the Transmission Link Link-3 is not Known in the BS Described first is the case in which the BS knows the transmission quality of the channel of the transmission link Link-2 according to the report of the CQI from the MS, but does not know the transmission quality of the channel of the transmission link Link-3. In this case, the RS knows the transmission quality of the channel of the transmission link Link-3 according to the report of the CQI from the MS.

In this case, in the RS, the value of $\Gamma_2$ of the channel assigned to the grouped data block DB2 in the transmission link Link-3 is known. In addition, the latest values of $\Gamma_0$ and $\Gamma_1$ are reported from the MS not only to the BS but also to the RS, and therefore it is assumed that the values of $\Gamma_0$ and $\Gamma_1$ are known. Then, the RS calculates RBIR ($R_2^{(C)}$) of the grouped data block DB2 obtained by combining the data blocks DB0 and DB1 transmitted through the transmission link Link-2 by the following equation (2).

$$R_2^{(C)} = \frac{N_{P,2} \cdot R_2 + \alpha_2 \cdot N_{I,2} \cdot f(\Gamma_0 + \Gamma_2) + (1-\alpha_2) \cdot N_{I,2} \cdot f(\Gamma_1 + \Gamma_2)}{N_{I,2} + N_{P,2}} \quad (2)$$

In addition, the RS calculates $R_k^{(C)}$ (k=0, 1) of the RBIR of the data block DBk (k=0, 1) obtained by the MS combining the data blocks DB0 and DB1 transmitted through the transmission link Link-2 by the equations (3) and (4). $\Delta(\alpha_k, m_k)$ (k=0, 1) in the equation (4) corresponds to the SNR gain after the combination of the data blocks DB0 and DB1.

$$R_k^{(C)} = \max(R_k^{(C)}, R_2^{(C)})(\alpha_k=1) \quad (3)$$

$$R_k^{(C)} = f\{\Gamma_k + \Delta(\alpha_k, m_k)\}(\alpha_k \neq 1) \quad (3)$$

After calculating $R_0^{(C)}$, $R_1^{(C)}$, $R_2^{(C)}$ by the equations (2) through (4) above, the value of $\alpha_2$ satisfying the equations (5) and (6) is determined. Practically, each of the plural values of $\alpha_2$ (for example, $\alpha_2$=0, 0.2, 0.4, 0.8, 1.0) is sequentially processed, thereby determining $\alpha_2$ which satisfies the equations (5) and (6).

$$\min_{\alpha_2, m_2} \{\max[P_{BLER}(R_0^{(C)}), P_{BLER}(R_1^{(C)})]\} \quad (5)$$

$$P_{BLER}(R_2^{(C)}) \leq P_{TH} \quad (6)$$

By the equation (5) above, the value of $\alpha_2$ which outputs the smallest maximum value of the block error rate BLER (Block Error Rate) after the combination of the data blocks DB0 and DB1 is determined. When $\alpha_2$ is large (that is, the rate of the information bit $N_{I,0}$ in the information bit $N_{I,2}$ is high), the amount of increase of the SNR gain of the combined data block DB0 is larger than that of the data block DB1, thereby indicating the tendency of $P_{BLER}$ ($R_1^{(C)}$) larger than $P_{BLER}$ ($R_0^{(C)}$). On the other hand, when $\alpha_2$ is small (that is, the rate of the information bit $N_{I,1}$ in the information bit $N_{I,2}$ is high), the amount of increase of the SNR gain of the combined data block DB1 is larger than that of the data block DB0, thereby indicating the tendency of $P_{BLER}$ ($R_0^{(C)}$) larger than $P_{BLER}$ ($R_1^{(C)}$). Accordingly, $\alpha_2$ which satisfies the equation (5) is determined to well balance the values of $P_{BLER}$ ($R_0^{(C)}$) and $P_{BLER}$ ($R_1^{(C)}$). To be simple, when two data blocks are grouped, $\alpha_2$ can be 0.5.

Furthermore, by the equation (6) above, the MCS of the transmission link Link-3 is determined with the block error rate BLER of the grouped data block DB2 set as a value equal to or smaller than the threshold $P_{TH}$, thereby determining the MCS of the transmission link Link-3. For example, as illustrated in FIG. 3, the RS has mapping data in which the relationship between the PBIR and the BLER with respect to each MCS index ($m_0$, $m_1$, $m_2$, . . . ) is described, and an MCS index which generates the BLER corresponding to the calculated $P_{BLER}$ ($R_2^{(C)}$) and equal to or smaller than the threshold $P_{TH}$ is determined. The MCS index $m_k$ is data designating an MCS, for example, an MCS number.

As illustrated in the equation (2) above, since $P_{BLER}$ ($R_2^{(C)}$) varies depending on the value of $\alpha_2$, each of the values of $\alpha_2$ (for example, $\alpha_2$=0, 0.2, 0.4, 0.8, 1.0) is sequentially processed to determine an MCS index. The threshold $P_{TH}$ is, for example, 1%.

(2-1-2) When the BS Knows the Transmission Quality of the Channels of all Transmission Links Described next is the method of determining $\alpha_2$ when the BS knows the transmission quality of the channels of all transmission links according to the report of the CQI from the MS and/or the RS. In this case, the BS calculates RBIR ($R_0^{(C)} \sim R_2^{(C)}$) of each data block obtained by combining the data blocks DB0 through DB2 by the equations (7) through (9) below.

$$R_0^{(C)} = \frac{(N_{I,0} - \alpha_2 \cdot N_{I,2} + N_{P,0}) \cdot R_0 + \alpha_2 \cdot N_{I,2} \cdot f(\Gamma_0 + \Gamma_2)}{N_{I,0} + N_{P,0}} \quad (7)$$

$$R_1^{(C)} = \frac{(N_{I,1} - (1-\alpha_2) \cdot N_{I,2} + N_{P,1}) \cdot R_1 + (1-\alpha_2) \cdot N_{I,2} \cdot f(\Gamma_1 + \Gamma_2)}{N_{I,1} + N_{P,1}} \quad (8)$$

$$R_2^{(C)} = \frac{N_{P,2} \cdot R_2 + \alpha_2 \cdot N_{I,2} \cdot f(\Gamma_0 + \Gamma_2) + (1-\alpha_2) \cdot N_{I,2} \cdot f(\Gamma_1 + \Gamma_2)}{N_{I,2} + N_{P,2}} \quad (9)$$

After calculating $R_0^{(C)}$, $R_1^{(C)}$, and $R_2^{(C)}$ By the equations (7) through (9) above, $\alpha_2$ satisfying the equations (10) and (11) below, and the MCS index $m_k$ (k=0~2) corresponding to the transmission of each data block DBk (k=0~2) are determined. Practically, $\alpha_2$ satisfying the equations (10) and (11) is determined by sequentially processing each of the values of $\alpha_2$ (for example, $\alpha_2$=0, 0.2, 0.4, 0.8, 1.0).

$$\max_{m_0, m_1, m_2, \alpha_2} (N_{I,0} + N_{I,1}) \quad (10)$$

$$P_{BLER}(R_k^{(C)}) \leq P_{TH} \quad (11)$$

As illustrated in the equations (10) and (11), the corresponding MCS index $m_k$ (k=0~2) and the rate $\alpha_2$ are determined so that a total of the information bits of the data blocks DB0 and DB1 in the transmission link Link-2 can be maximized, and the block error rate BLER of all data blocks DB0 through DB2 can be equal to or smaller than the threshold $P_{TH}$. The threshold $P_{TH}$ is, for example, 1%.

As described above, the data transmission of each transmission link is optimized.

(2-2) Configuration of Base Station, Relay Station, and Mobile Station

Figure 5:
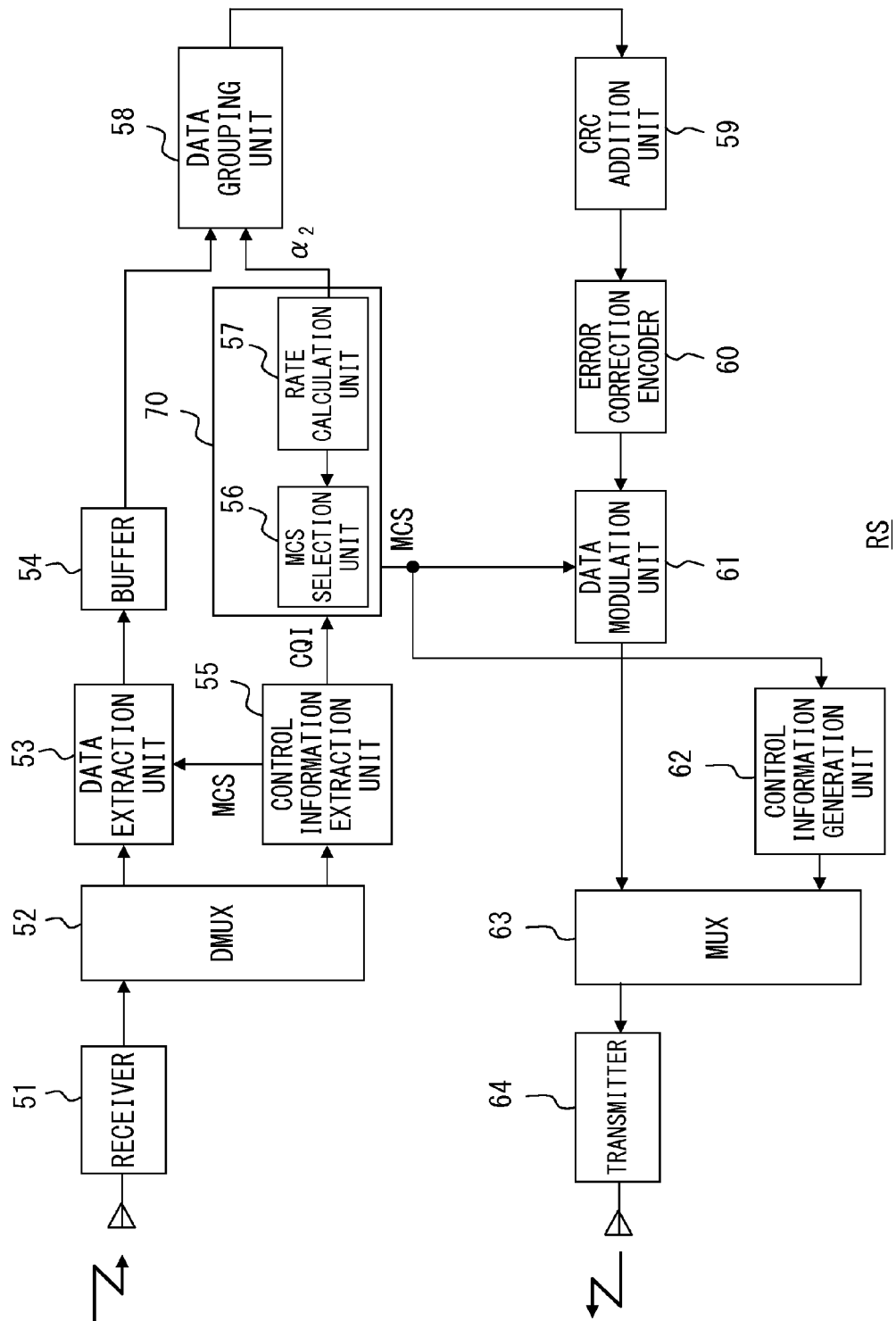
FIG. 5 is a block diagram of the important part of the internal configuration of the relay station according to an embodiment.
Figure 6:
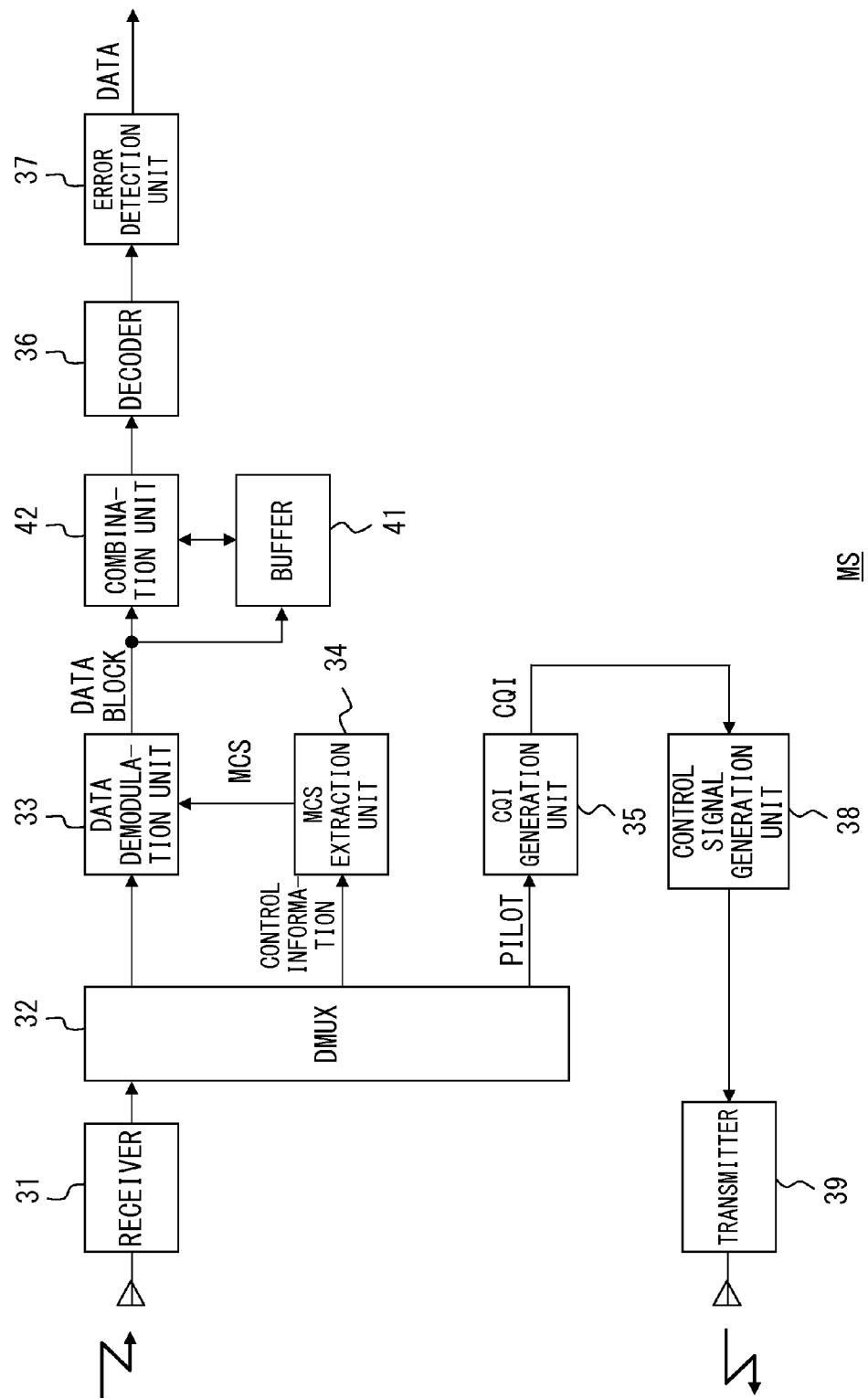
FIG. 6 is a block diagram of the important part of the internal configuration of the mobile station according to an embodiment.

The configurations of the base station, the relay station, and the mobile station in the radio communication system according to the present embodiment are described below with reference to FIGS. 4 through 6. FIG. 4 is a block diagram of the important part of the internal configuration of the base station. FIG. 5 is a block diagram of the important part of the internal configuration of the relay station. FIG. 6 is a block diagram of the important part of the internal configuration of the mobile station.

Configuration of Base Station (BS)

Described below is the configuration of a BS.

As illustrated in FIG. 4, the base station (BS) includes a receiver 11, a control signal extraction unit 12, an MCS selection unit 13, a pilot generation unit 14, a control information generation unit 15, a CRC addition unit 16, an error correction encoder 17, a data modulation unit 18, a multiplexing unit 19, and a transmitter 20.

In FIG. 4, an RF signal received by an antenna is converted into a digital baseband signal by the receiver 11. The control signal extraction unit 12 extracts the control information in a predetermined channel demultiplexing process on the baseband signal, and transmits the CQI included in the control information to the MCS selection unit 13.

The MCS selection unit 13 sets a plurality of MCS indexes corresponding to a plurality of MCSs obtained by combining any of QPSK, 16 QAM, and 64 QAM as a modulation system with any of 1/2, 2/3, 3/4, and 5/6 as a coding system (coding rate). Then, the MCS selection unit 13 selects an MCS index based on the CQI from the control signal extraction unit 12. The MCS index selected by the MCS selection unit 13 is notified to the data modulation unit 18.

The CRC addition unit 16 adds a CRC (Cyclic Redundancy Check) for error detection to the transmission data addressed to the MS. The error correction encoder 17 performs systematic coding for error correction on the data from the CRC addition unit 16. Thus, a data block configured by an information bit and a parity bit is generated. It is preferable that the systematic coding is turbo-coding.

The data modulation unit 18 modulates input data by the MCS (Modulation and Coding Scheme) designated by the MCS index provided from the MCS selection unit 13.

The control information generation unit 15 generates control information including the MCS index provided from the MCS selection unit 13, and outputs it to the multiplexing unit 19.

The multiplexing unit 19 multiplexes the data block from the data modulation unit 18, the control information from the control information generation unit 15, and the pilot generated by the pilot generation unit 14, thereby generating a packet including the data block. The packet is transmitted from the transmitter 20.

Configuration of Relay Station (RS)

Described below is the configuration of the RS.

As illustrated in FIG. 5, the relay station (RS) includes a receiver 51, a demultiplexing unit (DMUX) 52, a data extraction unit 53, a buffer 54, a control information extraction unit 55, an optimization unit 70 (an MCS selection unit 56, a rate calculation unit 57), a data grouping unit 58, a CRC addition unit 59, an error correction encoder 60, a data modulation unit 61, a data modulation unit 62, a multiplexing unit (MUX) 63, and a transmitter 64.

In FIG. 5, the DMUX 52 demultiplexes the packet received by the receiver 51 in a predetermined channel demultiplexing process.

When the RS receives a downlink signal from the BS, the data extraction unit 53 demodulates the packet from the BS based on the MCS index notified from the control information extraction unit 55, and extracts a data block. The buffer 54 sequentially receives data blocks and temporarily stores a plurality of data blocks grouped by the data grouping unit 58. For example, when the consecutive data blocks DB0 and DB1 are grouped by the data grouping unit 58, the data blocks DB0 and DB1 are temporarily stored in the buffer 54.

The control information extraction unit 55 extracts the CQI in the packet transmission through the transmission links (Link-2, Link-3) from the control information received from the MS after demultiplexed by the DMUX 52, and outputs the CQI to the optimization unit 70.

The optimization unit 70 is provided for optimizing the transmission of the grouped data through the transmission link Link-3. The optimization unit 70 includes the MCS selection unit 56 and the rate calculation unit 57 which respectively calculate the MCS index of the grouped data block to be transmitted to the MS and the rate ($\alpha_2$ described above) of the information bit of each data block included in the information bit of the grouped data block. The calculating methods are described above in (2-1-1) above.

The rate $\alpha_2$ calculated by the optimization unit 70 is output to the data grouping unit 58. The MCS determined by the optimization unit 70 is output to the data modulation unit 61 and the control information generation unit 62.

The data grouping unit 58 groups the data block stored in the buffer 54 based on the rate $\alpha_2$ calculated by the optimization unit 70, and generates a grouped data block.

The CRC addition unit 59 adds a CRC for error detection to the grouped data block addressed to the MS. The error correction encoder 60 performs systematic coding (preferably turbo-coding) for error correction on the grouped data block from the CRC addition unit 59. Thus, a parity bit in the grouped data block is generated.

The data modulation unit 61 modulates the input data by the MCS (Modulation and Coding Scheme) designated by the MCS index provided from the optimization unit 70. The control information generation unit 62 generates the control information including the MCS index provided from the optimization unit 70, and outputs the information to the MUX 63.

The MUX 63 multiplexes the grouped data block from the data modulation unit 61, the control information from the control information generation unit 62, and a pilot (not illustrated in the attached drawings), and generates a packet including the grouped data. The packet is transmitted from the transmitter 64

Configuration of Mobile Station (MS)

Described below is the configuration of an MS.

As illustrated in FIG. 6, the mobile station (MS) includes a receiver 31, a demultiplexing unit (DMUX) 32, a data demodulation unit 33, an MCS extraction unit 34, a CQI generation unit 35, a decoder 36, an error detection unit 37, a control signal generation unit 38, a transmitter 39, a buffer 41, and a combination unit 42.

The receiver 31 receives a plurality of packets (data blocks) from the BS through the transmission link Link-2, and receives a packet (grouped data block) from the RS through the transmission link Link-3. The DMUX 32 demultiplexes the data block (or grouped data block), the control information, and the pilot from the packet obtained from the receiver 31.

The MCS extraction unit 34 extracts an MCS index from the control information from the BS or the RS. The data demodulation unit 33 demodulates a data block or a grouped data block based on the MCS index. Then, a plurality of data blocks are temporarily stored in the buffer 41.

When the grouped data block corresponding to a plurality of data blocks in the buffer 41 are demodulated by the data demodulation unit 33, the combination unit 42 combines corresponding data (information bits) between the grouped data block and a plurality of data blocks in the buffer 41. Thus, the SNR gains of the information bits processed in the combination are improved.

The decoder 36 performs a decoding process (preferably, turbo-decoding) corresponding to the error correction coding system in the transmission station (BS) on each data block after the combining process by the combination unit 42. The error detection unit 37 performs error detection on each data block based on the CRC added to each data block The CQI generation unit 35 extracts a pilot (reference signal) demultiplexed by the DMUX 32, and generates a CQI indicating the transmission quality of a channel based on the pilot. To generate the CQI, the CQI generation unit 35 measures, for example, the above-mentioned SNR (Signal to Noise Ratio), an SIR (Signal to Interference Ratio), an SINR (Signal to Interference plse Noise Ratio), etc. The generated CQI is output to the control signal generation unit 38. The control information including the CQI is generated by the control signal generation unit 38, and transmitted by the transmitter 39 to the BS and the RS.

(2-3) Operation of Relay System

The operation of the relay system according to the present embodiment is described below with reference to FIG. 7. FIG. 7 is a flowchart of the operations of the BS, RS, and MS indicating the operation of the relay system according to the present embodiment.

In the relay system, the MS calculates the CQI of the channel of the transmission link Link-2 according to a pilot received from the BS, and reports the result to the BS and the RS along a predetermined channel (step S10). Then, the BS selects an MCS based on the CQI reported from the MS (step S12). Furthermore, the BS modulates the two data blocks DB0 and DB1 obtained by, for example, the turbo-coding by the modulation and coding scheme (MCS) selected in step S10, and transmits the result to the MS through the transmission link Link-2 (first radio transmission path) (step S14).

Simultaneously with step S14, the BS transmits the two data blocks DB0 and DB1 to the RS through the transmission link Link-1 (step S16). Upon receipt of the two data blocks DB0 and DB1, the RS generates the grouped data block DB2 based on the two data blocks. The grouped data block DB2 is configured by an information bit obtained by grouping a part of each information bit of the two data blocks DB0 and DB1 and a parity bit configured by, for example, the turbo-coding.

Now, the MCS for transmission of the grouped data block DB2 and the rate $\alpha_2$ of each data block included in the information bit of the grouped data block are determined as described in (2-1-1) above (steps S20 and S22). As described above in (2-1-1), the MCS and the rate $\alpha_2$ determined in steps S20 and S22 are processed by considering the combination of corresponding data performed in the MS between the two data blocks DB0 and DB1 and the grouped data block DB2. Since the SNR gain of the grouped data block DB2 in the MS increases by the data combination, the MCS determined in step S20 can be an MCS of a higher transmission efficiency than the case in which the data combination is not performed so far as the target BLER is identical.

Then, the RS modulates the generated grouped data block DB2 by the MCS selected in step S20, and transmits the result to the MS through the transmission link Link-3 (second radio transmission path) (step S24). In the MS, it combines corresponding data between the data blocks DB0 and DB1 received in step S14 and the grouped data block DB2 received in step S24 (step S26).

As described above in detail, in the relay system according to the present embodiment, the MS combines corresponding data between a plurality of data blocks received through the transmission link Link-2 (first radio transmission path) and the grouped data block received through the transmission links Link-1 and Link-3 (second radio transmission path). In the data combination the SNR gain of the combined information bits can be improved. Therefore, the MCS set for a data block (including a grouped data block) in each transmission link can have a high transmission efficiency, thereby improving the throughput of the entire system.

(3) Third Embodiment

Described next is the relay system according to the third embodiment.

In the relay system according to the third embodiment, corresponding data is combined between a plurality of data blocks received through the transmission link Link-2 (first radio transmission path) and a grouped data block received through the transmission links Link-1 and Link-3 (second radio transmission path) so that the likelihood of the received data can be enhanced.

(3-1) Configuration of Mobile Station (MS)

Figure 8:
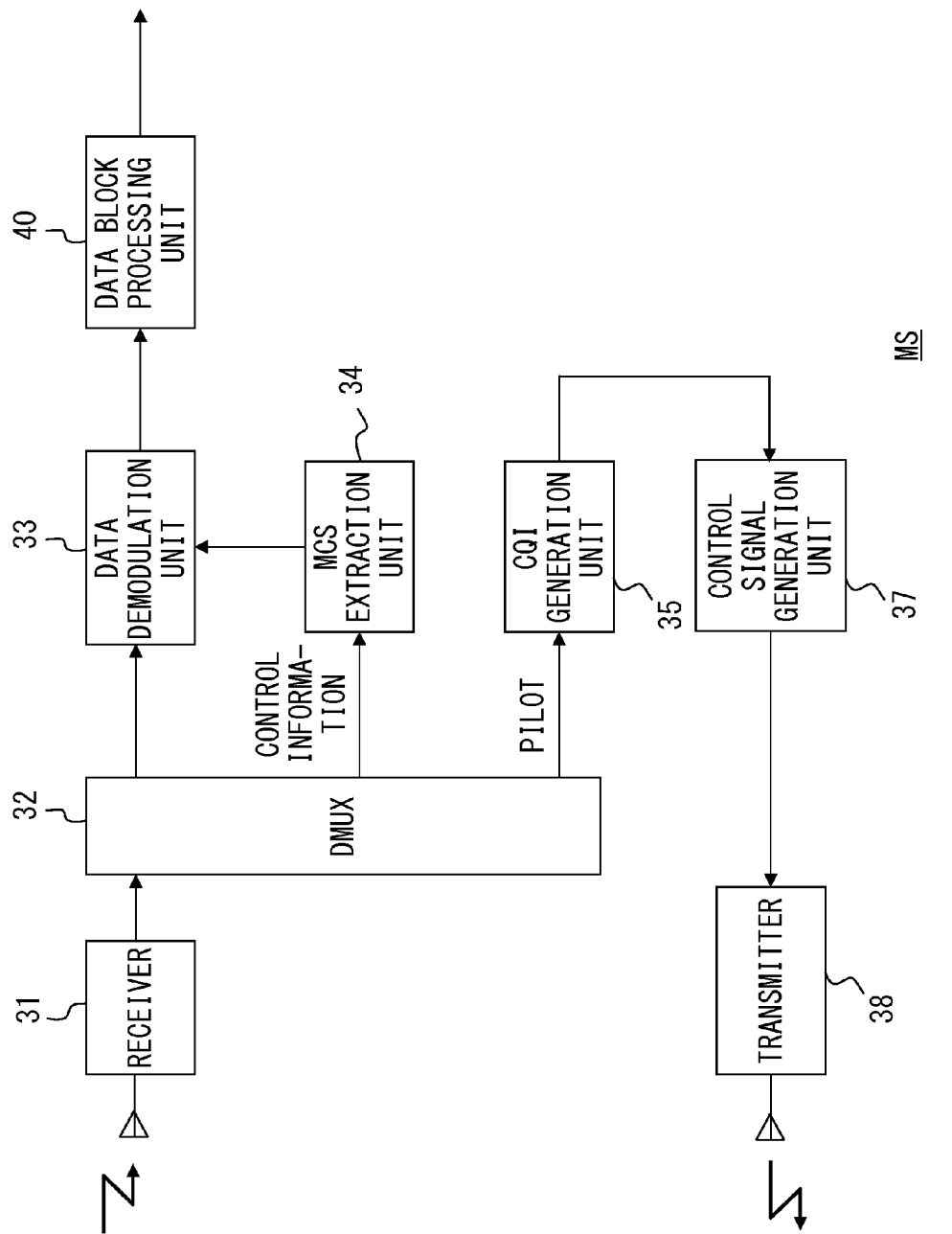
FIG. 8 is a block diagram of the important part of the internal configuration of the mobile station according to an embodiment.

The configuration of the MS as a reception device in the relay system is described below with reference to FIGS. 8 and 9. FIG. 8 is a block diagram of the important part of the internal configuration of the MS according to the third embodiment. FIG. 9 is a block diagram for explanation of an example of the configuration of the data block processing unit of the MS. In FIG. 8, the same component as illustrated in FIG. 6 is assigned the same reference numeral, and the explanation is omitted here.

With reference to FIG. 8, the configuration of the MS is different from the configuration illustrated in FIG. 6 in that the process on the data block as the output of the data demodulation unit 33 is performed by a data block processing unit 40. The data block processing unit 40 combines a plurality of demodulated data blocks with the likelihood enhanced.

Next, FIG. 9 is an example of the configuration of the data block processing unit 40 when a grouped data block is configured based on two data blocks. As illustrated in FIG. 9, the data block processing unit 40 includes combination units 1020 through 1022, decoders 1030 through 1032, error detection units 1040 through 1042, and a buffer 101. In FIG. 9, each of the error detection units 1040 through 1042 is illustrated schematically as a switch in the "closed state" when there is no error to a data block.

In FIG. 9, the combination unit 1020, the decoder 1030, and the error detection unit 1040 are provided for processing the data block DB0. The combination unit 1021, the decoder 1031, and the error detection unit 1041 are provided for processing the data block DB1. The combination unit 1022, the decoder 1032, and the error detection unit 1042 are provided for processing a grouped data block. The buffer 101 is used for temporarily storing a plurality of data blocks (the data blocks DB0 and DB1 in the example in FIG. 9).

In the data block processing unit 40 in FIG. 9, when it is determined that the decoding process has been correctly performed as a result of the error detection on the plurality of data blocks and the grouped data block, the correctly decoded (that is, successfully decoded) information bit is fed back as SBs (Success Bits) to a combination unit. That is, when the decoding process is successfully performed by the decoder 1032, the error detection unit 1042 enters the "closed state", and the successfully decoded information bits SB of the grouped data block are fed back to the combination units 1020 and 1021. When the decoding process is successfully performed by the decoder 1030, the error detection unit 1040 enters the "closed state", and the successfully decoded information bits SB of the data block DB0 are fed back to the combination unit 1022. If the decoding process is successfully performed by the 1031, the error detection unit 1041 enters the "closed state", and the successfully decoded information bits SB of the data block DB1 are fed back to the combination unit 1022. The fed back information bits are used in each combination unit for enhancing the likelihood of the data.

In the relay system, it is preferable that the BS and the RS perform the turbo-coding on the information bits to be transmitted to generate a parity bit, and transmit a data block or a grouped data block. Then, in the data block processing unit 40 of the MS, the decoders 1030 through 1032 performs the turbo-decoding on the input data block or grouped data block.

(3-2) Process on Data Block

Next, the operation of the process performed when a grouped data block is configured based on two data blocks in the data block processing unit of the MS is described below with reference to FIGS. 10 and 11 in addition to FIG. 9. FIG. 10 is a configuration of two consecutive data blocks DB0 and DB1 and two grouped data blocks DB2 and DB3 based on the data blocks DB0 and DB1. FIG. 11 is an explanatory view of the operation of the process of the data block processing unit of the MS in step order. In FIG. 11, when error detection on a plurality of data blocks and grouped data block is performed, and it is determined that the correct decoding has been performed, it is indicated by "ACK". If it is determined that the decoding has not been correctly performed, it is indicated by "NACK".

As illustrated in FIG. 10, in the example of the operation of the process, the data block DB0 configured by an information bit (IB01+IB02) and a parity bit PB0, and the data block DB1 configured by an information bit (IB11+IB12) and a parity bit PB1 are transmitted from the BS to the MS and the RS. Then, the grouped data block DB2 including an information bit configured by a part IB01 of the information bit of the data block DB0 and a part IB11 of the information bit of the data block DB1, and a parity bit PB2 is generated in the RS, and transmitted to the MS. The grouped data block DB3 including the information bit configured by a part IB02 of the information bit of the data block DB0, and a part IB12 of the information bit of the data block DB1, and a parity bit PB3 is generated in the RS, and transmitted to the MS.

In the example of the operation of the process in FIG. 11, the two data blocks DB0 and DB1 from the BS are stored in the buffer 101, and the grouped data blocks DB2 and DB3 are input to the data block processing unit 40.

First, in step S1 in FIG. 11(a), when the grouped data blocks DB2 and DB3 are input, the corresponding data (information bits) are combined between the grouped data blocks DB2 and DB3 and the data blocks DB0 and DB1 in the buffer 101. In FIG. 11(a), the corresponding information bits are indicated by the arrows.

FIG. 9 illustrates the following process in step S1.

That is, the combination unit 1022 combines corresponding information bits between the grouped data blocks DB2 and DB3 and the data blocks DB0 and DB1 read from the buffer 101. Then, the combination unit 1022 outputs the grouped data blocks DB2 and DB3 after the data combination to the decoder 1032.

The combination unit 1020 combines corresponding information bits between the data block DB0 read from the buffer 101 and the input data blocks DB0 and DB1. Then, the combination unit 1020 outputs the data block DB0 after the data combination to the decoder 1030.

The combination unit 1021 combines corresponding information bits between the data block DB1 read from the buffer 101 and the input data blocks DB0 and DB1. Then, the combination unit 1021 outputs the data block DB1 after the data combination to the decoder 1031.

In the process in step S1, the SNR gain of the data blocks DB0 through DB3 increases (about 3 dB in this example). Therefore, the probability of successful decoding is higher than in the case in which the data combination is not performed.

Assume that it is determined in step S1 that only the data block DB3 has been correctly decoded (ACK). It means that the correct information bits IB02 and IB12 have been obtained.

Next, in step S2 in FIG. 11(b), the correct information bits IB02 and IB12 obtained in step S1 are replaced with the corresponding information bits of the data blocks (that is, DB0, DB1) other than the already correctly decoded data blocks.

The process is described below with reference to FIG. 9. As a result of the decoding by the decoder 1032, when the data block DB3 is correctly decoded, the error detection unit 1042 enters the "closed state". Then, the information bits IB02 and IB12 as SBs (Success Bits) are transmitted to the combination units 1020 and 1021 respectively. The combination units 1020 and 1021 replace the respectively assigned information bits IB02 and IB12 with the corresponding information bits, thereby updating the data blocks DB0 and DB1.

As a result, the log likelihood ratios (LLR) of the replaced information bits in the information bits of the data blocks DB0 and DB1 are infinite, thereby enhancing the probability of successful turbo-decoding in the decoders 1030 and 1031 corresponding to each data block.

In step S2, as a result of the enhanced probability of successful turbo-decoding in the decoder 1030, it is assumed that it is determined (ACK) that the data block DB0 has been correctly decoded. It means that correct information bits IB01 and IB02 have been obtained.

Next, in step S3 in FIG. 11(*c*), the correct information bit IB01 newly obtained in step S2 is replaced with the corresponding information bit of the data block (DB2 in this case) other than the already correctly decoded data block.

This process is described below with reference to FIG. 9. As a result of the decoding by the decoder 1030, when the data block DB0 is correctly decoded (step S2), the error detection unit 1040 enters the "closed state". Then, the information bit IB01 as SBs (Success Bits) is transmitted to the combination unit 1022. The combination unit 1022 replaces the assigned information bit IB01 with the corresponding information bit, thereby updating the grouped data block DB2.

As a result, the LLR of the replaced information bit in the information bits of the grouped data block DB2 is infinite, thereby enhancing the probability of successful turbo-decoding in the decoder 1032 corresponding to the grouped data block DB2.

In step S3, as a result of the enhanced probability of successful turbo-decoding in the decoder 1032, it is assumed that it is determined (ACK) that the grouped data block DB2 has been correctly decoded. It means that correct information bits IB11 has been newly obtained.

Next, in step S4 in FIG. 11(*d*), the correct information bit IB11 newly obtained in step S3 is replaced with the corresponding information bit of the data block (DB1 in this case) other than the already correctly decoded data block.

This process is described below with reference to FIG. 9. As a result of the decoding by the decoder 1032, when the grouped data block DB2 is correctly decoded (step S3), the error detection unit 1042 enters the "closed state". Then, the information bit IB11 as SBs (Success Bits) is transmitted to the combination unit 1021. The combination unit 1021 replaces the assigned information bit IB11 with the corresponding information bit, thereby updating the data block DB1.

In the data block DB1, another information bit IB01 has already been correctly obtained in step S2, and the LLR of the entire information bits is infinite by correctly replacing the information bit IB11. Therefore, the turbo-decoding is successfully performed in the decoder 1031 corresponding to the data block DB1.

In steps S1 through S4 above, in the data block processing unit 40 of the MS, all information bits of the data blocks DB0 and DB1 have been correctly decoded.

As described above, in the relay system according to the present embodiment, the MS combines corresponding data (information bits) between a plurality of data blocks received through the transmission link Link-2 (first radio transmission path) and the grouped data block received through the transmission links Link-1 and Link-3 (second radio transmission path). Thus, the SNR gain of the received data block increases.

In addition, if the decoding of any data block is successfully performed in the plurality of data blocks (including grouped data block) received through the first and second radio transmission paths, the decoding result is used to enhance the likelihood of the data (information bits) in other data blocks. Therefore, the relay system according to the present embodiment can enhance the decoding capability in the MS (reception device) more efficiently than the system according to the second embodiment, thereby further improving the throughput.

The configurations and processes for improving the decoding capability when two data blocks are grouped have been described with reference to FIGS. 9 through 11, but similar effects can be realized when three or more data blocks are grouped. In this case, for example, in the data block processing unit illustrated in FIG. 9, the combination units, the decoder, and the error detection units are to be provided in parallel for each of the data blocks to be grouped.

Described below is an example of a hardware configuration of the radio base station. The radio base station includes a radio IF (interface), a processor, memory, a logical circuit, a cable IF, etc. The radio IF is an interface device for performing radio communications with a radio terminal. The processor is a device for processing data, and can be, for example, a CPU (central processing unit), a DSP (digital signal processor), etc. The memory is a device for storing data, and can be, for example, ROM (read only memory), RAM (random according to memory), etc. The logical circuit is an electronic circuit for performing a logical operation, and can be, for example, an LSI (large scale integration), an FPGA (field-programming gate array), etc. The cable IF is an input device for performing cable communications with other radio base stations etc. connected to a network on the network side of the mobile telephone system (so-called backhaul network).

The correspondence between the radio base station illustrated in FIG. 4 and the hardware is, for example, described below. The radio IF corresponds to, for example, the receiver 11 and the transmitter 20. The processor, the logical circuit, and the memory correspond to, for example, the control information extraction unit 12, MCS selection unit 13, pilot generation unit 14, control information generation unit 15, CRC addition unit 16, error correction encoder 17, data modulation unit 18, and the MUX 19. The cable IF is not illustrated in the attached drawings.

Described below is an example of a hardware configuration of the relay station. The relay station includes a radio IF (interface), a processor, memory, a logical circuit, etc. The radio IF is an interface device for performing radio communications with a radio base station. The processor is a device for processing data, and can be, for example, a CPU (central processing unit), a DSP (digital signal processor), etc. The memory is a device for storing data, and can be, for example, ROM (read only memory), RAM (random according to memory), etc. The logical circuit is an electronic circuit for performing a logical operation, and can be, for example, an LSI (large scale integration), an FPGA (field-programming gate array), etc.

The correspondence between the relay station illustrated in FIG. 5 and the hardware is, for example, described below. The radio IF corresponds to, for example, the receiver 51 and the transmitter 64. The processor, the logical circuit, and the memory correspond to, for example, the DMUX 52, data extraction unit 53, buffer 54, control information extraction unit 55, MCS selection unit 56, rate calculation unit 57, data grouping unit 58, CRC addition unit 59, error correction encoder 60, data modulation unit 61, data modulation unit 62, and the MUX 63.

Described below is an example of a hardware configuration of the radio terminal. The radio terminal includes a radio IF (interface), a processor, memory, a logical circuit, an input IF, an output IF, etc. The radio IF is an interface device for performing radio communications with a radio base station. The processor is a device for processing data, and can be, for example, a CPU (central processing unit), a DSP (digital signal processor), etc. The memory is a device for storing data, and can be, for example, ROM (read only memory), RAM (random according to memory), etc. The logical circuit is an electronic circuit for performing a logical operation, and can be, for example, an LSI (large scale integration), an FPGA (field-programming gate array), etc. The input IF is a device for performing an inputting operation, and can be, for example, an operation button, a microphone, etc. The output IF is a device for performing an outputting operation, and can be, for example, a display, a speaker, etc.

The correspondence between the radio terminal illustrated in FIG. 6 and the hardware is, for example, described below. The radio IF corresponds to, for example, the receiver 31 and the transmitter 39. The processor, the logical circuit, and the memory correspond to, for example, the DMUX 32, data demodulation unit 33, MCS extraction unit 34, CQI generation unit 35, decoder 36, error detection unit 37, control signal generation unit 38, transmitter 39, buffer 41, and the combination unit 42. The input IF and the output IF are not illustrated in the attached drawings.

What is claimed is:

1. A radio communication system comprising:
    a reception apparatus comprising a first wireless communication interface and a first processor; and
    a transmission apparatus comprising:
        a second wireless communication interface configured to transmit a wireless signal to the reception apparatus; and
        a second processor configured for
        generating a plurality of data blocks and a grouped data block by grouping the plurality of data blocks; and
        controlling the second wireless communication interface to transmit the plurality of data blocks through a first radio transmission path simultaneously with transmitting the grouped data block through a second radio transmission path better in radio transmission quality than the first radio transmission path, wherein
    the first processor is configured for controlling the first wireless communication interface to receive the plurality of data blocks transmitted through the first radio transmission path, and the grouped data block transmitted through the second radio transmission path.

2. The system according to claim 1, wherein
the first processor is further configured for combining corresponding data between the plurality of received data blocks and the grouped data block.

3. The system according to claim 2, wherein
the first processor combines data received through the second radio transmission path with likelihood of the data enhanced.

4. The system according to claim 1, wherein
the first radio transmission path does not include a relay station for performing a radio relay, and the second radio transmission path includes a relay station for performing a radio relay.

5. The system according to claim 2, wherein:
    a rate of each data block in the grouped data block is determined so that a highest block error rate in block error rates obtained after combining data by the first processor on each data block is determined as a lowest rate; and
    a modulation and coding scheme for the grouped data block is determined so that a block error rate of a grouped data block can be equal to or smaller than a predetermined threshold.

6. The system according to claim 1, wherein:
    a rate of each data block in the grouped data block is determined so that a total information bits of each data block can be highest; and
    a modulation and coding scheme for each data block is determined so that a block error rate of each data block can be equal to or smaller than a predetermined threshold.

7. A base station comprising:
    a wireless communication interface configured to transmit a wireless signal to a mobile station; and
    a processor configured for
    generating a plurality of data blocks and a grouped data block by grouping the plurality of data blocks; and
    controlling the wireless communication interface to transmit the plurality of data blocks to a mobile station through a first radio transmission path simultaneously with transmitting the grouped data block to a mobile station through a second radio transmission path better in radio transmission quality than the first radio transmission path.

8. A mobile station comprising:
    a wireless communication interface; and
    a processor configured for controlling the wireless communication interface to receive a plurality of data blocks through a first radio transmission path and receive a grouped data block obtained by grouping the plurality of data blocks through a second radio transmission path better in radio transmission quality than the first radio transmission path;
    wherein the plurality of data blocks and the grouped data block are transmitted simultaneously.

9. A radio communication method for a radio communication system having a reception apparatus and a transmission apparatus for transmitting a radio signal to the reception apparatus, comprising:
    generating, by the transmission apparatus, a plurality of data blocks and a grouped data block by grouping the plurality of data blocks;
    transmitting, by the transmission apparatus, the plurality of data blocks through a first radio transmission path simultaneously with transmitting the grouped data block through a second radio transmission path better in radio transmission quality than the first radio transmission path; and
    receiving, by the reception apparatus, the plurality of data blocks transmitted through the first radio transmission path, and the grouped data block transmitted through the second radio transmission path.

10. The method according to claim 9, further comprising
combining, by the reception apparatus, corresponding data between the plurality of received data blocks and the grouped data block.

11. The method according to claim 10, further comprising
combining, by the reception apparatus, data received through the second radio transmission path with likelihood of the data enhanced.

* * * * *